Figure 1:
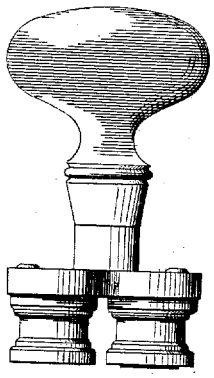

M. P. NORTON.

POST OFFICE, POST MARKING, AND CANCELING HAND STAMP.

No. 4,143. Reissued Oct. 4, 1870.

Witnesses:
Edw. W. Down
A. Gillmor

Inventor:
Marcus P. Norton

THE NORRIS PETERS CO., PHOTO-LITHO., WASHINGTON, D. C.

UNITED STATES PATENT OFFICE.

MARCUS P. NORTON, OF TROY, NEW YORK, ASSIGNOR TO HELEN M. INGALLS, OF SAME PLACE.

IMPROVEMENT IN POST-OFFICE POSTMARKING AND CANCELING HAND-STAMPS.

Specification forming part of Letters Patent No. 38,175, dated April 14, 1863; Reissue No. 1,748, dated August 23, 1864; Reissue No. 3,586, dated August 3, 1869; Reissue No. 4,143, dated October 4, 1870. And also Letters Patent No. 106,716, dated August 23, 1870.

DIVISION A.

*To all whom it may concern:*

Be it known that I, MARCUS P. NORTON, of the city of Troy, in the county of Rensselaer and State of New York, have invented new and useful Improvements in Postmarking Letters, Packets, &c., and in the Canceling of the Postage-Stamps thereon, in the manner and by the means substantially as hereinafter described and set forth; that Letters Patent of the United States were duly issued thereon under and bearing date April 14, 1863, which were assigned and transferred under a certain agreement and by virtue of a certain instrument in writing, bearing date the 20th day of April, 1863, and recorded in the United States Patent Office on the 8th day of March, 1864, in Liber $C^7$, page 458, of Transfers of Patents, to Jacob Shavor and Albert C. Corse, of said city of Troy, county, and State, and who, on or about the 23d day of February, A. D. 1864, duly reassigned and retransferred the said invention, improvements, and Letters Patent to the said MARCUS P. NORTON, inventor and assignee aforesaid, by a certain instrument in writing, duly executed, and bearing date on the said 23d day of February, 1864, and which assignment and transfer from said Jacob Shavor and Albert C. Corse was duly recorded in the said United States Patent Office on the 24th day of July, 1869, in Liber $U^{11}$, page 319, of Transfers of Patents; on or about the 23d day of October, A. D. 1869, I, the said MARCUS P. NORTON, by deed of assignment in writing, did lawfully assign and transfer unto HELEN M. INGALLS, of the city of Troy, State of New York, the said invention and Letters Patent, dated and reissued as hereinbefore stated and set forth, which deed of assignment was duly recorded in the United States Patent Office on the 1st day of August, 1870, in Liber $B^{13}$, page 351, of Transfers of Patents, and who is now the lawful owner thereof, under and by virtue of the said sale, assignment, and transfer so made, executed, and delivered, and recorded as before stated. Now, therefore, I, the said MARCUS P. NORTON, do hereby declare the following to be a full, clear, and exact description of the construction and operation thereof, reference being had hereinafter to the accompanying drawings, and to the letters of reference marked thereon, which drawings, so marked and lettered, hereby make a part of these my specifications of and concerning my said invention and improvements herein contained and set forth.

Like letters refer to and represent like and corresponding parts of my said invention.

Figure 2:
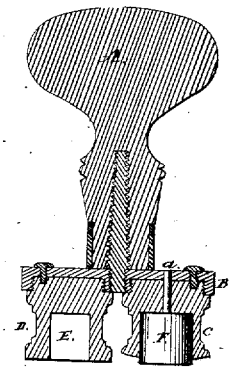
Figure 6:
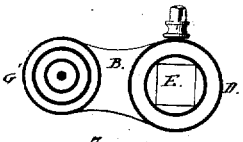
Figure 3:
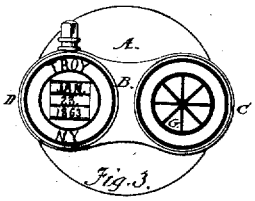
Figure 5:
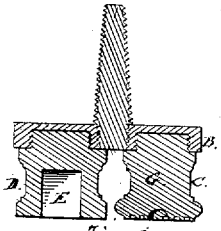
Figure 4:
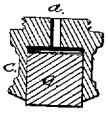
Figure 8:
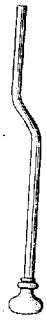
Figure 7:
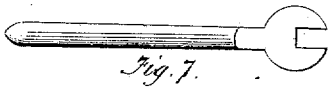

Figure 1 represents a side elevation of the postage-stamp-canceling and postmarking device hereinafter described and set forth, for canceling postage-stamps with any suitable ink contained upon such instrument, at the same time, blow, and operation of the making of the postmark on the letter, envelope, or packet, one side of and from such postage-stamp or frank so canceled. Fig. 2 represents a vertical section taken on a line through the center of the various parts of the postmarking and post-canceling device or instrument herein contained, described, and set forth. Fig. 3 represents a face view of the device, showing the postmarking stamp ready for use, and the postage-canceling die or device, made of wood, used endwise, or of cork, rubber, or other suitable material therein inserted, in the manner substantially as shown, and more at large described hereinafter. Fig. 4 shows a device for the purpose of canceling postage-stamps or letter-franks used to represent value, by the use and power of any suitable ink, by means of wood, cork, or any elastic material for the type or die, which may be used for that purpose separate and alone or in combination with any suitably-constructed postmarking stamp or device, substantially as shown at Fig. 3 of the said drawings. Fig. 5 represents a vertical section of a postmarking and postage-stamp-canceling device or die combined, and constructed entirely of iron, steel, or other metal, and more fully described hereinafter. Fig. 6 is a plan or face view of Fig. 5, showing the postage-stamp-canceling device or die made of iron, steel, or other suitable metal or material. Fig. 7 represents the wrench used for securing the dating-type in a proper place within the postmarking device, having the name of the town or post-office where used engraved thereon in relief letters. Fig. 8 represents the tool or instrument used for removing the cork, wood, or rubber die or type used for canceling postage-stamps from the tube or surrounding case where held or contained, so as to repair or replace the same with a new one when worn out or unfit for use.

The nature of my said invention and improvements herein contained and described consists in the employment and combination of a device or die used for the more complete and perfect cancellation of postage-stamps or letter-franks by means of soft wood, used endwise, or of cork, rubber, or other suitable material, whereby such stamp or frank is effaced and canceled, in and by indelible or other ink, in the manner substantially as herein described and set forth.

It also consists in the combination of a postage-stamp-canceling device or die, constructed of wood, cork, rubber, or any suitable material, with any suitably-arranged and constructed postmarking stamp or device, so as to cancel, efface, or destroy the postage-stamp or letter-frank with indelible or any suitable ink at the same time, blow, or operation of the stamp or instrument by which the postmark is given or made upon the letter, envelope, or packet, substantially as herein described and set forth.

It also consists of the postmarking of letters, envelopes, or packets, and in the cancellation of the postage stamp or stamps thereon, with, in, or by any suitable ink, or similar material, by means of some soft wood, used endwise against the postage-stamp, or by the means of cork, rubber, iron, or steel, or by means of any other suitable material, so combined with the postmarking stamp or instrument as to cancel, efface, or destroy the postage stamp or stamps at one and the same blow or operation of the entire instrument thus constructed for that purpose, whereby to prevent a second or re-use of such postage stamp or stamps.

To enable others skilled in the art to which my said invention and improvements relate to make and use the same, I will here proceed to describe the construction and operation thereof, which are substantially as follows—that is to say, I construct the postmarking device or stamp D of any suitable material, and of any size in diameter required, while in length it must correspond to the canceling device and die or type.

E, Fig. 3, is the mortise or recess, of suitable dimensions, to receive the type for the month, day of the month, and for the year, and called or known as the "dating-type," around which is the name of the town or post-office where used, in relief letters, and upon the lower face of such postmarking stamp or device.

I construct the postage-canceling stamp or device G (for the purpose of canceling, in a more perfect and thorough manner, the postage-stamps on letters, envelopes, or packets) of wood, used endwise upon the postage-stamp, or of cork, rubber, or of any suitable or elastic material, and insert the same in the tube or recess F, which is that part of the canceling device marked C of the accompanying drawings, and which is connected to, and combined with, the said cross-piece B, as herein described.

I prefer to have the diameter of the canceling device and die or type F, Figs. 2, 3, and 4, about the same as the width of the postage-stamp to be canceled or destroyed by means of the same.

The said canceling die or type G may be of any length required, and so made as to correspond with the tube or recess F, and closely to fit the same, and it may be made of wood, cork, rubber, or of any elastic material, as aforesaid.

The face of this device may contain a plan or form for canceling the postage-stamp in, with, or by ink, like unto that shown at Fig. 3, or it may have any configuration deemed proper to use for the purpose aforesaid.

The said device, die, or type G will project somewhat below the face of the postmarking device D, if deemed best so to do, and it may be removed out of the said tube or recess F by means of a pin or bolt, substantially like that shown at Fig. 8, the lower end of which operates in and through the aperture *a*, Figs. 2 and 4, for the purpose of repairs, or to replace it by a new one when desired.

A is the operating-handle, firmly secured to the cross-bar B by any suitable mechanical means, and it will be made of wood, &c.

The said postage-stamp-canceling device, die, or type G, being thus constructed of cork, wood, or rubber, or other elastic material, and combined with the said device C, with recess or tube F therein, as aforesaid, will receive and contain, on the face or configuration thereof, the ink aforesaid, in quantities sufficient to permanently cancel, efface, or destroy the postage-stamp whereon the same is used while postmarking letters, packets, &c., in such manner as to prevent the said postage-stamp being cleansed of the said canceling-ink by any chemical or other process; for the said canceling-ink, so put upon the postage-stamp by means of said cork, die, or type, would be so effectual that any attempt or effort to remove it therefrom would entirely destroy, or nearly so, the aforesaid postage-stamp, and thus and thereby render the same incapable for, or of, a second or other use without immediate detection.

The said cork, rubber, or other suitable elastic material, used as aforesaid, will render the said postmarking and postage-stamp-canceling die or type of a more easy, and consequently rapid, use, because of there being a yielding of the said canceling die or type G when the blow is given upon the letter, envelope, or packet and postage-stamp, as aforesaid; the operator will not tire as much by means of a constant, continuous, and rapid use of the same; and it will also somewhat aid the operator in raising the entire instrument or apparatus from the paper or packet and postage-stamp when the impression thereon and the cancellation of such postage-stamp shall have been given by the operator, in the manner substantially as aforesaid.

The said canceling type or die can be easily repaired, or replaced by a new one whenever desired, and at very little expense; and such canceling die or type G may extend upward to the said cross-bar B, and there be connected to the same by means of a screw, pin, or small bolt. In such case there would not be any tube or pipe surrounding said canceling die or type G. The operation and effect produced would, in such case of construction, be the same.

The said postage-stamp-canceling device, die, or type G may be of any desired distance from the aforesaid postmarking or dating device or stamp D, or it may be securely fastened to the immediate side of the said postmarking and dating part or stamp or device D by any convenient and suitable mechanical means.

The said canceling die, type, or device G, I prefer to use made of cork, as it will hold a much greater quantity of canceling-ink upon and in the lower face thereof, and when it comes in contact with the printed surface of the postage-stamp, such surface will become somewhat and sufficiently broken by means thereof, and thus, and thereby, inject into or impregnate such broken surface with the said canceling-ink, whereby such postage-stamp, so operated upon and filled with such ink, cannot be sufficiently cleansed by any means as to enable it to be reused, or used a second time, in fraud upon the postal revenue, without immediate detection of the same.

Soft wood, used endwise, will answer nearly the same purpose. Still, long and continued use, after the granting of my said patent, April 14, 1863, has fully proven the superiority of the cork for the canceling die or type used upon postage-stamps, as aforesaid.

The said tube or cylinder C, Figs. 2, 3, and 4, may be constructed in any suitable manner, or by any convenient means, and thereafter fastened to the under side of the said cross-bar B in or by any mechanical means which will answer the required purpose. It may also be of any form or shape deemed best.

I also construct my said postage-stamp-canceling device, die, or type of cast-iron, steel, or other suitable metal, substantially as shown at G′, Figs. 5 and 6, and which may be secured to the said cross bar or piece B in like manner as the said tube or cylinder C, Figs. 2 and 4, and which is done either by screw and nut where the same unites with the said cross-bar, or it may there be firmly fastened by means of suitably constructed and arranged pins or rivets; or the same may be soldered to the under side of said cross bar or piece B, or otherwise attached thereto.

The said postmarking and dating device D is also secured to the under side of said cross bar or piece B, and at or near the end thereof opposite that where said tube or cylinder C, or canceling die, type, or device G, is securely fastened, as aforesaid, in like manner and by substantially the same means as used for such fastening of said canceling device to said cross-bar upon the under side of the same, as aforesaid.

The aforesaid metal canceling device, die, or type G′, Figs. 5 and 6, may also be fastened or secured to the immediate side of the said postmarking device by any good and sufficient means, substantially as hereinbefore described and set forth in reference to the said device C, or tube or cylinder constructed to receive and contain the said type or die G, Figs. 2, 3, and 4.

Such metallic device, die, or type may also have upon its lower face or lower surface any suitable configuration deemed best to use for the purpose of canceling the postage-stamp in, with, or by any suitable ink at the same time, blow, and operation of the instrument or apparatus, as hereinbefore stated and set forth.

In any and every case the postmarking of the letter, envelope, or packet, and the effacing or cancellation of the postage-stamp or letter-frank thereon representing value, are done at the same time and by the same blow or operation of the said several devices and parts, constructed and combined in the manner and by the means substantially as herein described and set forth.

Both the postmarking and cancellation of the said postage-stamp are done with indelible or other and suitable ink used for such cancellation or effacing of the postage-stamp, and that, too, without any injury to the letter, envelope, or packet, or to the contents thereof, as would be the case were the said postage-stamp canceled by being cut in several parts and places by means of cutters or knives constructed for that express use and purpose, as is the case by the cutters or knives contained and set forth in Letters Patent granted to me on the 9th day of August, A. D. 1859, also on the 16th day of December, A. D. 1862, the first of which contains no guard or guards to said knives or cutters, while the second contains such guard or guards, for the purpose of preventing such cutters or knives from cutting too much or too deep in and upon said postage-stamps.

The said instrument and devices herein set forth and described will not, under any circumstances, cut either the letter, envelope, or postage-stamp thereon in any way or manner, but perform the cancellation required to be done in, with, and by ink only, as aforesaid, no cutting device whatever being used. But the said cork device, die, or type will, when it comes in contact with the printed or enameled-like surface of the postage-stamp, somewhat mar, bruise, or break the same by means of the blow given by the instrument, whereby to prepare the same to be filled by or impregnated with any suitable ink used for such cancellation, substantially as aforesaid.

In no case could a fraud be committed by a second or re-use of the government postage-stamp or letter-frank representing value without being discovered.

This arrangement and combination of devices will greatly hasten or facilitate the making up of the mails for transportation. It will also economize in labor, and reduce the labor in postmarking letters, and in the canceling of the postage-stamps thereon, to about, if not entirely, one-half of the number of workmen, laborers, or clerks absolutely necessary when and where this combined instrument is not used in the manner aforesaid. It therefore saves at least one-half of the labor required in the postmarking of letters, envelopes, or packets, and in the cancellation of the postage-stamps thereon. It also makes the cancellation of the postage-stamps more effectual or permanent, so as to prevent a second or re-use of such postage-stamps by any means whatever, which is very important in the successful management of the post-offices in this country, whereby and by means of which large sums of money are annually saved this government; and frauds upon the postal revenue, by the second and re-use of postage-stamps, are also prevented by the use of my invention and improvements herein contained, described, and set forth.

By the use of said invention the letters to be mailed and prepared for transportation by means of postmarking the same, and in canceling the postage-stamps thereon, as aforesaid, need not be handled over but once, thus and thereby economizing in time and in labor.

The cross bar or piece B, Figs. 1, 2, 3, and 5, may be of any suitable width or thickness, or of any metal which will answer the required purpose. It may also be of any length deemed best to use, in order to get the said postmarking device and the said postage-canceling device, die, or type suitably arranged upon the lower surface of the same, and thereto firmly and securely fastened or attached, in the manner substantially as aforesaid.

The type whereby to give the date are arranged in the said mortise E, as shown at Figs. 3 and 6, and are there held in their proper place by means of a set-screw, substantially as shown in Figs. 2, 3, and 6.

The cork or other material used for the canceling device, die, or type will be pressed into the said tube or pipe at recess F, cylinder C, Fig. 2, and the same is there firmly held, substantially as shown at G, Fig. 4.

The device or configuration for the cancellation of the postage-stamp, in the manner substantially as aforesaid, may be seen at C and G, Fig. 3, where cork is used; but when iron, steel, or other suitable metal is used, the device or configuration may be as seen at G′, Fig. 6.

The invention and improvements contained in and covered by the several claims hereto annexed, or below given, is and are not contained in the Letters Patent granted on my application, in due form, on the 9th day of August, 1859, nor is, nor are, the same to be found in my said Letters Patent granted to me December 16, 1862; but the said invention and improvements are contained in my caveat duly filed in the United States Patent Office in the year 1853, containing, also, other improvements.

Having thus described my original invention and improvements in postmarking and post-canceling devices, combined and arranged for the purposes aforesaid, what I claim, and desire to secure by Letters Patent of the United States of America, is—

1. The postage-stamp-canceling-device cylinder or tube C, containing a die or type, G, made of cork, wood, or other suitable material, or any equivalent for said cylinder or tube C, or for the said canceling die or type G, whereby to efface, cancel, or destroy the postage-stamp with indelible or other ink, in the manner and for the purposes substantially as herein described and set forth.

2. The canceling-device cylinder or tube C, with cork or wood, or any substantial equivalent thereof, forming the die or type G therein, in combination with the cross bar or piece B, and with the postmarking device D, substantially as and for the purposes herein described and set forth.

3. The postmarking of letters, envelopes, and packets, and the cancellation of the postage-stamps thereon, with ink, at one and the same blow or operation, with the instrument, in the manner, and by the means substantially as herein described and set forth.

4. The employment and combination of a postmarking device with a postage-stamp-canceling device, both being operated by one and the same handle, for the postmarking of letters, envelopes, or packets, and for the cancellation of the postage-stamps thereon, with indelible or other ink, in the manner substantially as herein described and set forth.

In testimony whereof I have on this 14th day of September, 1870, hereunto set my hand in the presence of two witnesses, to wit:

MARCUS P. NORTON.

Witnesses:

FREDK. KOONES

EDW. W. DONN